March 4, 1941.  M. J. HUNT  2,234,078
SHELLER PLATE AND CONCAVE FOR THRESHING MACHINES
Filed April 29, 1939
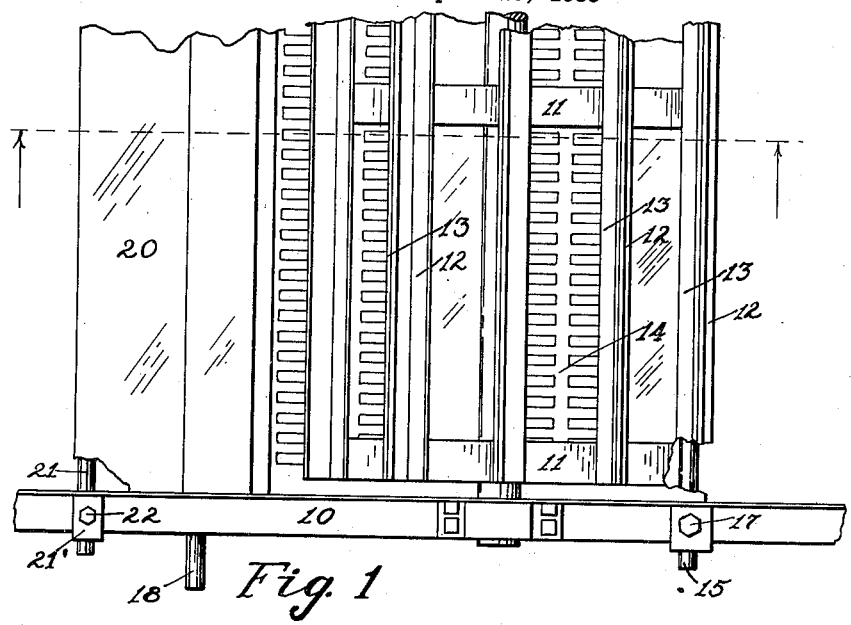
Fig. 1
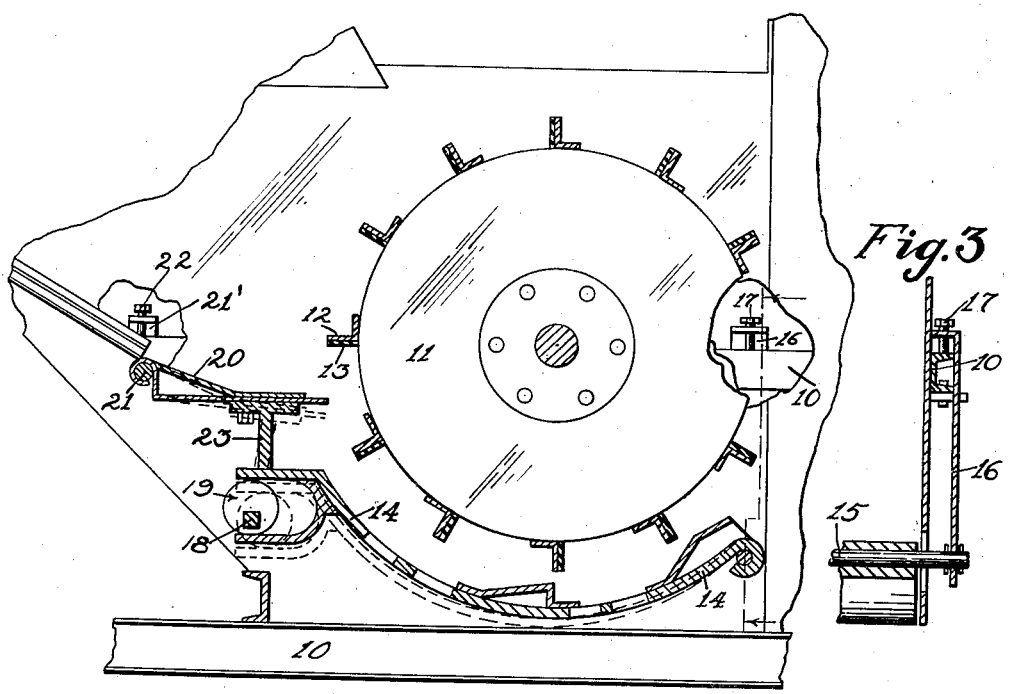
Fig. 2
Fig. 3
Inventor.
Marion J. Hunt
by Orwig & Hague Attys.

Patented Mar. 4, 1941

2,234,078

UNITED STATES PATENT OFFICE 2,234,078

SHELLER PLATE AND CONCAVE FOR THRESHING MACHINES

Marion J. Hunt, Peoria, Ill., assignor to Wood Brothers Thresher Company, Des Moines, Iowa, a corporation of Iowa Application April 29, 1939, Serial No. 270,790

1 Claim. (Cl. 130—27)

My object is to provide a concave and sheller plate for threshing machines which may be readily, quickly and easily adjusted to such positions relative to the cylinder as to thresh with maximum efficiency, materials of widely different characteristics such as oats, soy beans, etc.

Referring to the accompanying drawing:

Figure 1 shows a top or plan view of a cylinder concave and sheller plate embodying my invention;

Figure 2 shows a vertical sectional view of same on the line 2—2 of Fig. 1; and

Figure 3 shows a detail sectional view on the line 3—3 of Figure 2.

The frame is indicated by the reference numeral 10. A rotatable cylinder 11 is mounted in the frame and is provided with longitudinally arranged cylinder bars 12 having rubber facings 13.

The concave 14 is pivotally supported at its discharge end upon the bar 15. At each end of the bar 15 is a hanger 16 for supporting the bar, and this hanger is made adjustable vertically by a bolt 17 engaging a part of the frame 10.

At the forward end of the concave there is a shaft 18 rotatably mounted in the frame, and on this shaft is an eccentric 19 engaging the under surface of the concave, for vertically adjusting the forward end of the concave and supporting it in various positions of its adjustment.

For supporting material to be threshed in position to be engaged by the cylinder bars I have provided a sheller plate 20 pivoted at its forward end to a bar 21. This bar is supported in hangers 21' having adjusting bolts 22 similar to the one shown in Fig. 3. The body portion of the plate rests upon a T-bar 23 fixed to the forward end of the concave. The delivery end of the plate is normally approximately horizontal and extends close to the path of travel of the cylinder bars.

With material such as small grain with the stalks relatively free from weeds and relatively unentangled the best results are obtained by having the sheller plate horizontal and close to the cylinder bars, because in that position when a cylinder bar strikes a portion of a head of grain the remainder of the head will be firmly supported on the plate and a maximum shelling action is obtained.

When the material is matted or entangled, and the seeds relatively large, for instance soy beans, the best results are attained by tilting the sheller plate downwardly and away from the cylinder, thereby widening the throat to the cylinder and concave and permitting the vines to slide easily into the concave.

During a threshing operation it is frequently necessary to adjust the seeder plate to attain maximum efficiency. With my improvement this may be accomplished quickly and easily by turning the eccentric shaft 18. This may be done while the thresher is operating, and this single operation widens the throat between the front of the cylinder and the concave and also tilts the seeder plate to position where the material slides over it more readily, and yet is held relatively close to the cylinder bars. The rear end of the concave and the forward end of the seeder plate may be independently adjusted.

In practice, when threshing small grain I preferably adjust the concave and seeder plate to the positions shown in Fig. 2. When the operator observes a tendency for the material to slug, he adjusts them to the position shown by dotted lines in Fig. 2, whereupon the slugged condition is overcome and the grain passes readily through the throat between the sheller plate and cylinder bars and the front end of the concave.

I claim as my invention:

The combination with a threshing machine cylinder, of a concave pivotally supported at its discharge end for permitting up and down movement of its receiving end, a support fixed to the receiving end of the concave and extended upwardly above the concave and in front of the cylinder, a sheller plate pivotally supported at its edge furthest from the cylinder adjacent the receiving end of the concave and pivoted about an axis parallel to the axis of the threshing cylinder and extended in a substantially horizontal position toward the cylinder to form, with the cylinder, a restricted throat, and having a downward extension to slidably rest upon said support fixed to the receiving end of the concave, whereby a downward movement of the receiving end of the concave will increase the area and capacity of said throat.

MARION J. HUNT.